US012487287B2

(12) United States Patent
La et al.

(10) Patent No.: US 12,487,287 B2
(45) Date of Patent: Dec. 2, 2025

(54) METHOD, APPARATUS AND COMPUTER-READABLE MEDIUM FOR DIAGNOSING DEGREE OF DETERIORATION OF SURGE PROTECTOR

(71) Applicant: SAMSUNG SDI CO., LTD., Yongin-si (KR)

(72) Inventors: Taehyoung La, Yongin-si (KR); Yoonjoong Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 153 days.

(21) Appl. No.: 18/411,301

(22) Filed: Jan. 12, 2024

(65) Prior Publication Data

US 2025/0116704 A1 Apr. 10, 2025

(30) Foreign Application Priority Data

Oct. 5, 2023 (KR) .......................... 10-2023-0132458

(51) Int. Cl.
*G01R 31/327* (2006.01)
*H02H 9/04* (2006.01)

(52) U.S. Cl.
CPC ..... *G01R 31/3275* (2013.01); *G01R 31/3274* (2013.01); *H02H 9/04* (2013.01)

(58) Field of Classification Search
CPC ............ G01R 31/1236; G01R 31/3274; G01R 31/3275; G01R 19/16571; H02H 9/04; H02H 9/041; H02H 9/042
See application file for complete search history.

(56) References Cited

U.S. PATENT DOCUMENTS

| 6,031,705 | A | * | 2/2000 | Gscheidle | .............. H02H 3/202 |
| | | | | | 361/111 |
| 6,118,639 | A | | 9/2000 | Goldstein | |
| 6,535,369 | B1 | | 3/2003 | Redding et al. | |
| 10,270,240 | B2 | * | 4/2019 | Bandel | ..................... H02H 3/00 |

(Continued)

FOREIGN PATENT DOCUMENTS

| KR | 10-1982105 | 5/2019 |
| KR | 10-2289530 | 8/2021 |
| KR | 10-2407483 | 6/2022 |

OTHER PUBLICATIONS

Extended European Search Report dated Oct. 10, 2024, for corresponding EP Patent Application No. 24169797.8.

*Primary Examiner* — Thang X Le
(74) *Attorney, Agent, or Firm* — Lee IP Law, P.C.

(57) ABSTRACT

An apparatus for diagnosing a surge protector connected to a battery includes a first switch configured to open and close a line that connects the first line to the second line by being directly connected to one end of each of the first line and the second line, a second switch configured to open and close a line that connects the second line to the third line by being directly connected to one end of each of the second line and the third line, and a processor configured to control opening/closing operations of the first switch and the second switch, measure a diagnostic voltage applied to the diagnostic resistor according to the opening/closing operation of the first switch and the second switch, and diagnose the surge protector based on the diagnostic voltage. A corresponding method and non-transitory computer-readable medium are also disclosed.

15 Claims, 5 Drawing Sheets

(56) References Cited

U.S. PATENT DOCUMENTS

| | | | |
|---|---|---|---|
| 2002/0126433 A1* | 9/2002 | Hoopes | H02H 9/042 |
| | | | 361/103 |
| 2008/0068027 A1 | 3/2008 | Crain et al. | |
| 2014/0071572 A1* | 3/2014 | Lin | H02H 3/025 |
| | | | 361/91.8 |
| 2021/0066013 A1 | 3/2021 | Kumar et al. | |

* cited by examiner

METHOD, APPARATUS AND COMPUTER-READABLE MEDIUM FOR DIAGNOSING DEGREE OF DETERIORATION OF SURGE PROTECTOR

CROSS-REFERENCE TO RELATED APPLICATION

Korean Patent Application No. 10-2023-0132458, filed on Oct. 5, 2023, in the Korean Intellectual Property Office, the entire disclosure of which is incorporated herein by reference.

BACKGROUND

1. Field

Embodiments relate to a method, apparatus and computer-readable medium with programming code stored to perform the method, for diagnosing a degree of deterioration of a surge protector connected to a battery.

2. Description of the Related Art

Secondary batteries are batteries that may be repeatedly charged and recharged unlike non-rechargeable primary batteries. Low-capacity secondary batteries are used in portable small electronic devices such as smartphones, feature phones, laptop computers, digital cameras, and camcorders, and high-capacity secondary batteries are widely used as power sources for driving motors such as hybrid vehicles and electric vehicles and batteries for power storage. A secondary battery includes an electrode assembly including a positive electrode and a negative electrode, a case in which the electrode assembly is accommodated, and an electrode terminal connected to the electrode assembly.

An energy storage system (ESS) including such a secondary battery may include a surge protector (SPD) for protecting equipment from a surge. The SPD may protect a user's equipment from an external surge by flowing energy through a metal oxide varistor (MOV) if surge energy is introduced.

Although the SPD has an external contact (RC) that may determine whether the MOV operates, the RC is connected to a thermal disconnector (TD) that is a module independent of the MOV. Ultimately, it is the MOV that actually protects against an external surge, but a TD operation and an RC contact state change only if the MOV becomes unstable, and thus, the user may recognize the situation and a time difference between the MOV failure and the RC contact change may not be predicted. In some embodiments, the user may not be aware of the fact that the MOV of the SPD has already failed or is on the verge of failure and thus may not effectively protect against an external surge.

The above information disclosed in this section of BACKGROUND is only for enhancement of understanding of the background of the present invention, and therefore it may contain information that does not constitute prior art.

SUMMARY

Embodiments include an apparatus for diagnosing a surge protector connected to a battery. The apparatus includes a first line connected to a first pole of the surge protector directly connected to one end of the battery and including a first protection element of the surge protector on the first line, a second line connected to a second pole of the surge protector directly connected to a ground and including a second protection element of the surge protector and a diagnostic resistor on the second line, a third line connected to a third pole of the surge protector directly connected to another end of the battery and including a third protection element of the surge protector on the third line, a first switch configured to open and close a line that connects the first line to the second line by being directly connected to one end of each of the first line and the second line, a second switch configured to open and close a line that connects the second line to the third line by being directly connected to one end of each of the second line and the third line, and a processor that may be configured to control opening and closing operations of the first switch and the second switch, measure a diagnostic voltage applied to the diagnostic resistor according to the opening and closing operations of the first switch and the second switch, and diagnose the surge protector based on the diagnostic voltage.

In embodiments, the processor may be further configured to form a first closed circuit that connects the first line to the second line by closing the first switch and opening the second switch.

In embodiments, the processor may be further configured to measure a diagnostic voltage applied to the diagnostic resistor by allowing a voltage between the ground and one end of the battery applied to the first closed circuit to be distributed to the first protection element, the second protection element, and a resistor on the first closed circuit including the diagnostic resistor.

In embodiments, the processor may be further configured to form a second closed circuit that connects the second line to the third line by opening the first switch and closing the second switch.

In embodiments, the processor may be further configured to measure a diagnostic voltage applied to the diagnostic resistor by allowing a voltage between the ground and the other end of the battery applied to the second closed circuit to be distributed to the second protection element, the third protection element, and a resistor on the second closed circuit including the diagnostic resistor.

In embodiments, the processor may be further configured to periodically measure the diagnostic voltage applied to the diagnostic resistor by alternately controlling opening and closing of the first switch and the second switch and diagnosing a failure of the surge protector if a change rate of the diagnostic voltage equal to or greater than a pre-determined threshold value.

In embodiments, the diagnostic resistor may include a first diagnostic resistor and a second diagnostic resistor connected in series on the second line, the second diagnostic resistor having a lower resistance value than the first diagnostic resistor, and wherein the processor may be further configured to measure a diagnostic voltage applied to the second diagnostic resistor and diagnose the surge protector based on the measured diagnostic voltage.

Embodiments include a method of diagnosing a surge protector connected to a battery. The method includes controlling an operation of a first switch that opens and closes a line that connects a first line to a second line by being directly connected to one end of each of the first line and the second line, wherein the first line may be connected to a first pole of the surge protector directly connected to one end of the battery and includes a first protection element of the surge protector on the first line and the second line may be connected to a second pole of the surge protector directly connected to a ground and includes a second protection element of the surge protector and a diagnostic resistor on the second line, controlling an operation of a second switch that opens and closes a line that connects the second line to a third line by being directly connected to one end of each of the second line and the third line, wherein the third line may be connected to a third pole of the surge protector directly connected to another end of the battery and includes a third protection element of the surge protector on the third line, and measuring a diagnostic voltage applied to the diagnostic resistor according to opening and closing operations of the first switch and the second switch and diagnosing the surge protector based on the measured diagnostic voltage.

In embodiments, the diagnosing of the surge protector may include forming a first closed circuit that connects the first line to the second line by closing the first switch and opening the second switch.

In embodiments, the diagnosing of the surge protector may include measuring a diagnostic voltage applied to the diagnostic resistor by allowing a voltage between the ground and one end of the battery may be applied to the first closed circuit to be distributed to the first protection element, the second protection element, and a resistor of the first closed circuit including the diagnostic resistor.

In embodiments, diagnosing of the surge protector may include forming a second closed circuit that connects the second line to the third line by opening the first switch and closing the second switch.

In other embodiments, diagnosing of the surge protector may include measuring a diagnostic voltage applied to the diagnostic resistor by allowing a voltage between the ground and the other end of the battery applied to the second closed circuit to be distributed to the second protection element, the third protection element, and a resistor on the second closed circuit including the diagnostic resistor.

In embodiments, diagnosing of the surge protector may include periodically measuring the diagnostic voltage applied to the diagnostic resistor by alternately controlling opening and closing of the first switch and the second switch and diagnosing a failure of the surge protector if a change rate of the diagnostic voltage is equal to or greater than a pre-determined threshold value.

In embodiments, the diagnostic resistor may include a first diagnostic resistor and a second diagnostic resistor connected in series on the second line, the second diagnostic resistor having a lower resistance value than the first diagnostic resistor, and wherein the diagnosing of the surge protector may include measuring a diagnostic voltage applied to the second diagnostic resistor and diagnosing the surge protector based on the measured diagnostic voltage.

Embodiments include a non-transitory computer-readable medium storing a computer program for a method of diagnosing a surge protector connected to a battery. The method includes controlling an operation of a first switch that opens and closes a line that connects a first line to a second line by being directly connected to one end of each of the first line and the second line, wherein the first line may be connected to a first pole of the surge protector directly connected to one end of the battery and includes a first protection element of the surge protector on the first line and the second line may be connected to a second pole of the surge protector directly connected to a ground and includes a second protection element of the surge protector and a diagnostic resistor on the second line, controlling an operation of a second switch that opens and closes a line that connects the second line to a third line by being directly connected to one end of each of the second line and the third line, wherein the third line may be connected to a third pole of the surge protector directly connected to another end of the battery and includes a third protection element of the surge protector on the third line, and measuring a diagnostic voltage applied to the diagnostic resistor according to opening and closing operations of the first switch and the second switch and diagnosing the surge protector based on the measured diagnostic voltage.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that where a layer or element is referred to as being "on" another layer or substrate, it can be directly on the other layer or substrate, or intervening layers may also be present. Further, it will be understood that if a layer is referred to as being "under" another layer, it can be directly under, and one or more intervening layers may also be present. It will also be understood that if a layer is referred to as being "between" two layers, it can be the only layer between the two layers, or one or more intervening layers may also be present.

As used herein, the term "and/or" includes any and all combinations of one or more of the associated listed items. Expressions such as "at least one of," where preceding a list of elements, modify the entire list of elements and do not modify the individual elements of the list.

Prior to the description, it should be understood that the terms used in the specification and the appended claims should not be construed as limited to general and dictionary meanings, but interpreted based on the meanings and concepts corresponding to technical embodiments of the present disclosure on the basis of the principle that the inventor is allowed to define terms appropriately for the best explanation. Therefore, the description herein is a preferable example for the purpose of illustrations only, not intended to limit the scope of the present disclosure. It will be further understood that the terms "comprise or include" and/or "comprising or including," where used in this specification, specify the presence of stated shapes, numbers, steps, operations, members, elements, and/or groups thereof, but do not preclude the presence or addition of one or more other shapes, numbers, steps, operations, members, elements, and/or groups thereof. Also, the use of "may" where describing embodiments of the present disclosure may refer to "one or more embodiments of the present disclosure."

In order to assist in understanding of the present disclosure, the accompanying drawings are not drawn to scale, but dimensions of some components may be exaggerated. The same reference numbers may be assigned to the same components in different embodiments. Also, where it is explained that certain parameters are uniform in a certain region, this may mean that the parameters are uniform in terms of an average.

It will be understood that, although the terms first, second, etc. may be used herein to describe various elements, these elements should not be limited by these terms. These terms are only used to distinguish one element from another element. Thus, a first element could be termed a second element without departing from the scope of the present disclosure.

As used herein, the singular forms are intended to include the plural forms as well, unless the context clearly indicates otherwise.

Hereinafter, formation of a first element in "an upper part (or a lower part)" or "on (or under)" of a second element means that the first element is formed while contacting an upper surface (or a lower surface) of the second element, and is not limited to exclude other elements between the second element and the first element formed on (or under) the second element.

If a component were described as "connected", "coupled", "linked" or "attached" to another component, it may mean the components are not only directly "connected", "coupled", "linked" but also may be indirectly "connected", "coupled", or "linked" via a third component. Also, where a certain portion is electrically coupled to another portion, the certain portion may directly connected to the other portion, or connected to the other portion with an intervening element therebetween.

Where "A and/or B" is used in the specification, it means A, B, or both A and B unless otherwise described. The term "and/or" includes any and all combinations of one or more of the associated listed items. Where referring to "C to D", it means C or higher and D or lower unless otherwise described.

Figure 1:
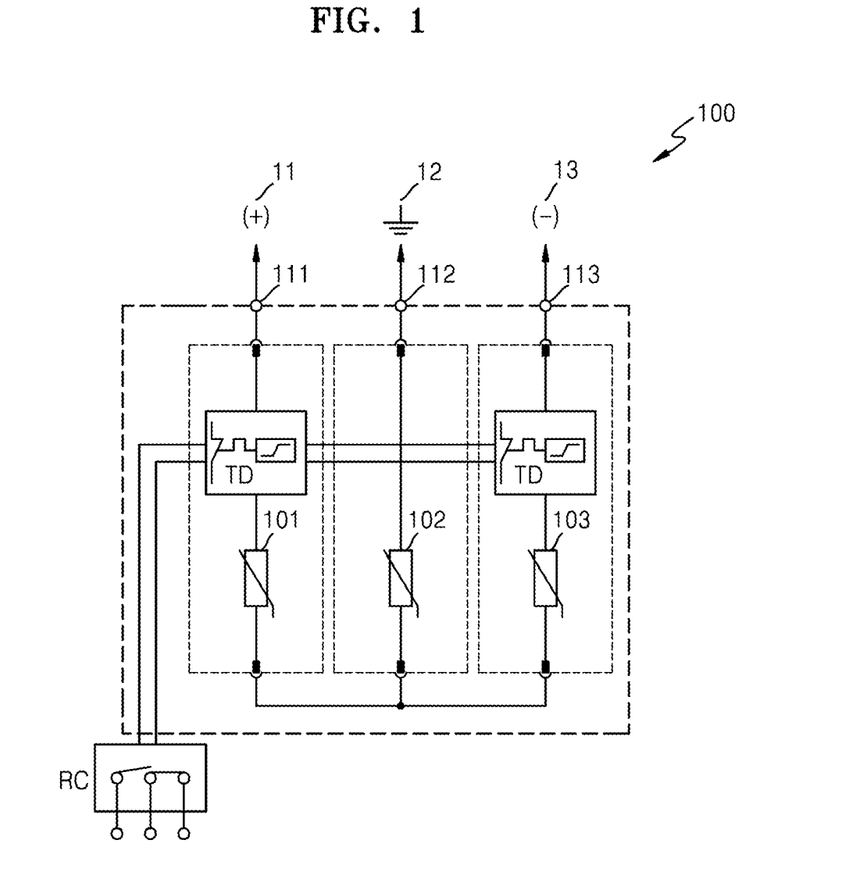
FIG. 1 is a diagram schematically illustrating a surge protector, according to embodiments of the present disclosure.
Figure 2:
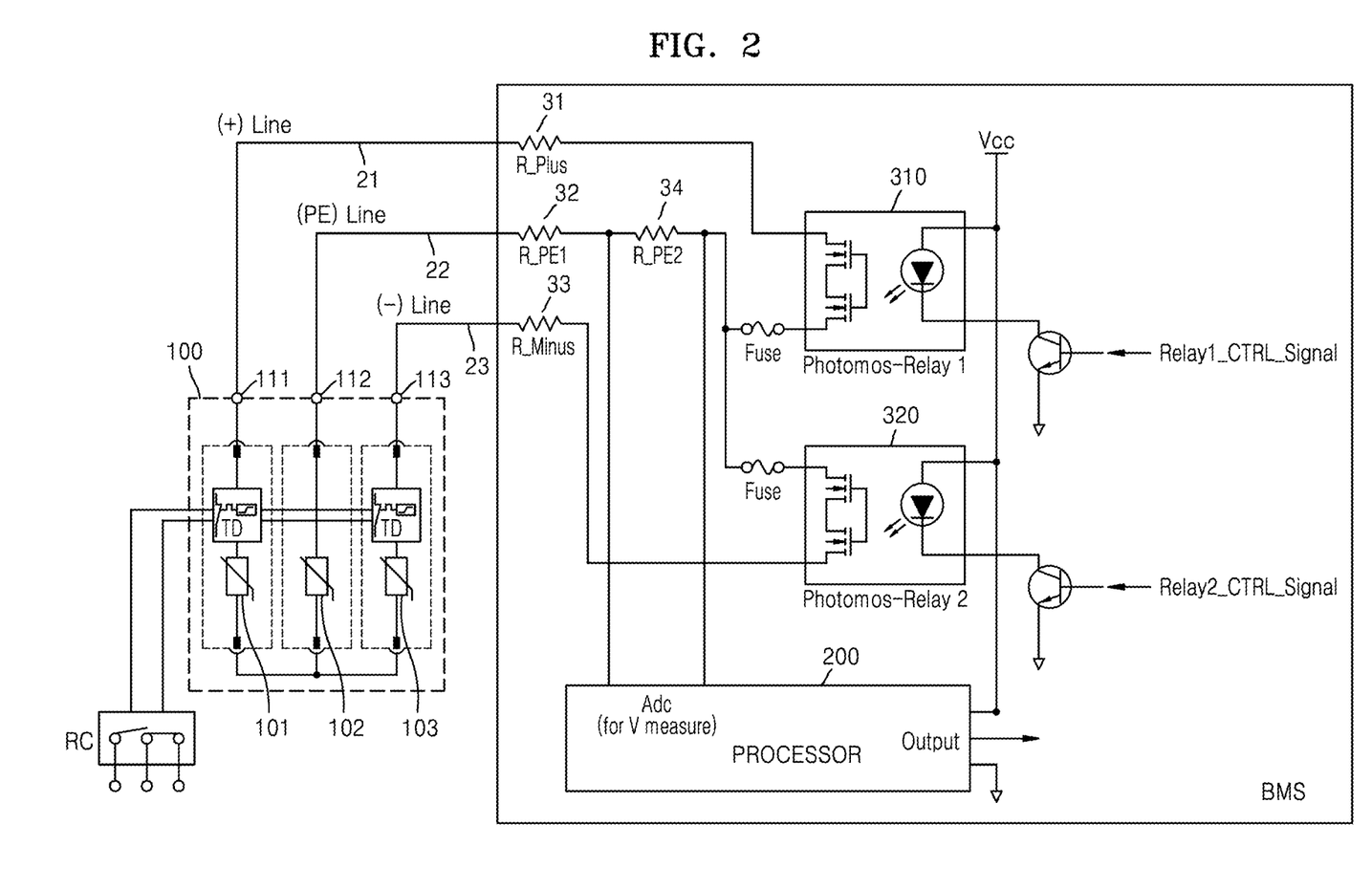
FIG. 2 is a diagram schematically illustrating a surge protector and a surge protector diagnosing apparatus, according to embodiments of the present disclosure.

FIG. 1 is a diagram schematically illustrating a surge protector, according to embodiments of the present disclosure. Also, FIG. 2 is a diagram schematically illustrating a surge protector and a surge protector diagnosing apparatus, according to one or more embodiments of the present disclosure.

Referring to FIG. 1, a surge protector 100 may include a first protection element 101, a second protection element 102, and a third protection element 103. In an example embodiment, the first protection element 101, the second protection element 102, and the third protection element 103 may each include a metal oxide varistor (MOV).

The surge protector 100 may include a first pole 111, a second pole 112, and a third pole 113. Referring to FIG. 1, the first pole 111 may be directly connected to a positive electrode 11 of the battery (only terminals of battery shown). Also, the second pole 112 may be directly connected to a ground 12. In an implementation, the ground 12 may refer to a ground of an energy storage system (ESS). Also, the third pole 113 may be directly connected to a negative electrode 13 of the battery.

The battery connected to the surge protector 100 may be a rechargeable secondary battery. In an example embodiment, the battery may include at least one selected from the group consisting of a nickel-cadmium battery, a lead storage battery, a nickel metal hydride (NiMH) battery, a lithium-ion battery, and a lithium polymer battery.

Referring to FIG. 2 together, the surge protector diagnosing apparatus according to embodiments of the present disclosure may include a first line 21, a second line 22, a third line 23, a first switch 310, a second switch 320, and a processor 200.

The first line 21 may be connected to the first pole 111 of the surge protector 100 and may be directly connected to one end of a battery. In an example embodiment, the first line 21 may be connected to the first pole 111 of the surge protector 100 and may be directly connected to the positive electrode 11 of the battery. Also, the first line 21 may include the first protection element 101 of the surge protector 100 on the first line. Also, the first line 21 may include a first line resistor 31 connected in series to the first protection element 101 on the first line.

The second line 22 may be connected to the second pole 112 of the surge protector 100 and may be directly connected to the ground. In an implementation, the second line 22 may be connected to the second pole 112 of the surge protector 100 and may be directly connected to the ground of the ESS. Also, the second line 22 may include the second protection element 102 of the surge protector 100 and a diagnostic resistor on the second line. In an example embodiment, referring to FIG. 2, the diagnostic resistor according to embodiments of the present disclosure may include a first diagnostic resistor 32 and a second diagnostic resistor 34 connected in series on the second line 22. In an implementation, the second diagnostic resistor 34 may have a lower resistance value than the first diagnostic resistor 32. However, the present disclosure is not limited thereto, and only one diagnostic resistor may be located on the second line 22. In other embodiments, a plurality of diagnostic resistors may be located on the second line 22.

The third line 23 may be connected to the third pole 113 of the surge protector 100 and may be directly connected to the other end of the battery. In an example embodiment, the third line 23 may be connected to the third pole 113 of the surge protector 100 and may be directly connected to the negative electrode 13 of the battery. Also, the third line 23 may include the third protection element 103 of the surge protector 100 on the third line. Also, the third line 23 may include a third line resistor 33 connected in series to the third protection element 103 on the third line.

The first switch 310 may be directly connected to one end of each of the first line 21 and the second line 22. In an implementation, referring to FIG. 2, the first switch 310 may have one end directly connected to one end of the first line 21 and the other end directly connected to one end of the second line 22. Also, the first switch 310 may open and close a line that connects the first line 21 to the second line 22. In an example embodiment, a fuse may be connected between the second line 22 and the first switch 310.

The second switch 320 may be directly connected to one end of each of the second line 22 and the third line 23. In an implementation, referring to FIG. 2, the second switch 320 may have one end directly connected to one end of the second line 22 and the other end directly connected to one end of the third line 23. Also, the second switch 320 may open and close a line that connects the second line 22 to the third line 23. In an example embodiment, a fuse may be connected between the second line 22 and the second switch 320.

The surge protector diagnosing apparatus according to embodiments of the present disclosure may include the processor 200. Also, the surge protector diagnosing apparatus according to embodiments of the present disclosure may include a memory.

The processor 200 controls an overall operation of the surge protector diagnosing apparatus. In an implementation, the processor 200 may selectively take the form of a processor, an application-specific integrated circuit (ASIC), another chipset, a logic circuit, a register, a communication modem, and/or a data processing device known in the art to perform the above operation. The processor 200 may perform basic arithmetic, logic, and input/output operations, and may execute, in an example embodiment, program code stored in the memory. The processor 200 may store data in the memory or load data stored in the memory. Also, the processor 200 may include an analog-to-digital converter (ADC) to measure a diagnostic voltage. Also, the processor 200 may periodically measure a diagnostic voltage at preset time intervals.

The processor 200 may control an opening/closing operation of the first switch 310 and the second switch 320. In an implementation, the processor 200 may control an opening (OFF) or closing (ON) operation of the first switch 310. Also, the processor 200 may control an opening (OFF) or closing (ON) operation of the second switch 320.

The processor 200 may measure a diagnostic voltage applied to the diagnostic resistor according to an opening/closing operation of the first switch 310 and the second switch 320. Also, the processor 200 may diagnose the surge protector 100 based on the diagnostic voltage. In an example embodiment, referring to FIG. 2, the processor 200 may measure a diagnostic voltage applied to the second diagnostic resistor 34 and may diagnose the surge protector 100 based on the diagnostic voltage.

The memory may be a recording medium readable by the processor 200 and may include a permanent mass storage device such as a RAM, a ROM, a disk drive, etc. An operating system and at least one program or application code may be stored in the memory. Data on the diagnostic voltage measured by the processor 200 may be stored in the memory.

Figure 3:
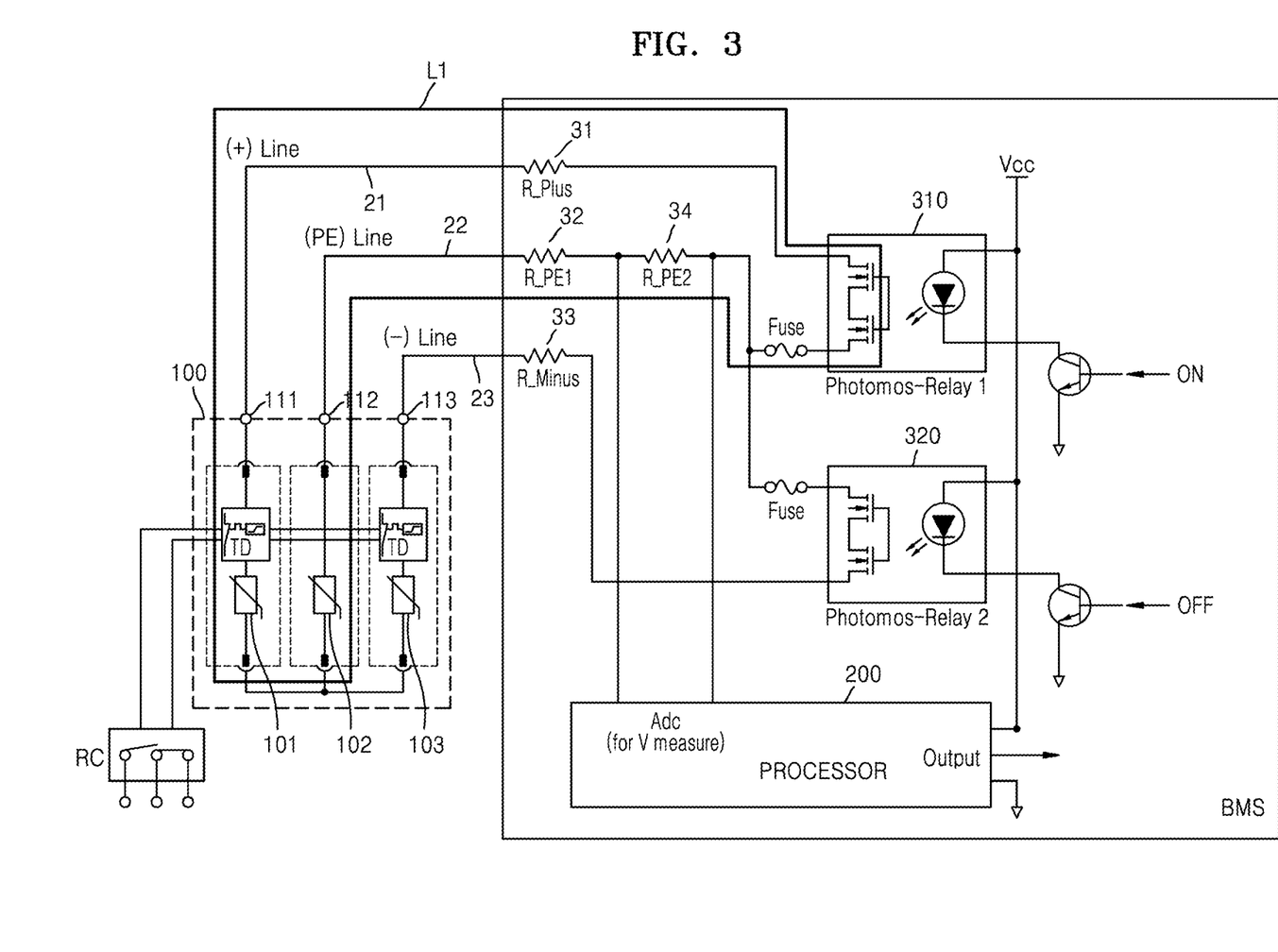
FIGS. 3 and 4 are diagrams for describing a surge protector diagnosing method, according to embodiments of the present disclosure.
Figure 4:
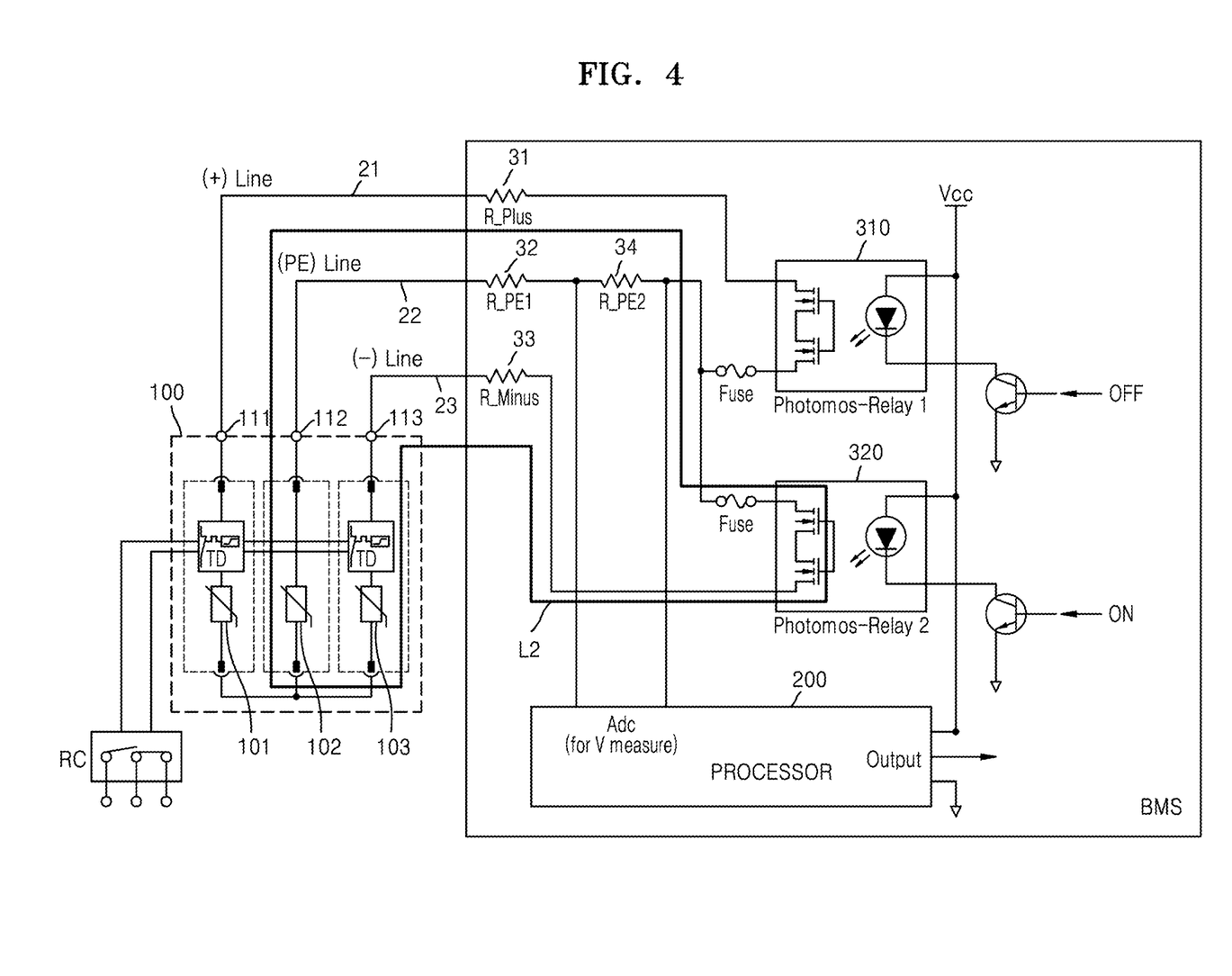

FIGS. 3 and 4 are diagrams for describing a surge protector diagnosing method, according to embodiments of the present disclosure.

First, referring to FIG. 3, an embodiment of forming a first closed circuit L1 according to embodiments of the present disclosure is illustrated.

The processor 200 may form the first closed circuit L1 that connects the first line 21 to the second line 22 by closing (ON) the first switch 310 and opening (OFF) the second switch 320.

The processor 200 may measure a diagnostic voltage applied to a diagnostic resistor and may diagnose a surge protector based on the diagnostic voltage. In an implementation, the processor 200 may measure a diagnostic voltage applied to a diagnostic resistor by allowing a voltage between the ground and one end of the battery applied to the first closed circuit L1 to be distributed to the first protection element 101, the second protection element 102, and a resistor on the first closed circuit L1 including the diagnostic resistor. In an example embodiment, referring to FIG. 3, a voltage may be distributed according to a voltage division rule to the first protection element 101, the second protection element 102, the first diagnostic resistor 32, the second diagnostic resistor 34, and the first line resistor 31 on the first closed circuit L1. In an implementation, a voltage between the positive electrode 11 of the battery and the ground 12 may be applied to the first closed circuit L1.

Referring to FIG. 4, an embodiment of forming a second closed circuit L2 according to embodiments of the present disclosure is illustrated.

The processor 200 may form the second closed circuit L2 that connects the second line 22 to the third line 23 by opening (OFF) the first switch 310 and closing (ON) the second switch 320.

The processor 200 may measure a diagnostic voltage applied to a diagnostic resistor and may diagnose a surge protector based on the diagnostic voltage. In an example embodiment, the processor 200 may measure a diagnostic voltage applied to a diagnostic resistor by allowing a voltage between the ground and the other end of the battery applied to the second closed circuit L2 to be distributed to the second protection element 102, the third protection element 103, and a resistor on the second closed circuit L2 including the diagnostic resistor. In an implementation, referring to FIG. 4, a voltage may be distributed according to a voltage division rule to the second protection element 102, the third protection element 103, the first diagnostic resistor 32, the second diagnostic resistor 34, and the third line resistor 33 on the second closed circuit L2. In an example embodiment, a voltage between the negative electrode 13 of the battery and the ground 12 may be applied to the second closed circuit L2.

The processor 200 may periodically measure a diagnostic voltage applied to a diagnostic resistor by alternately controlling opening/closing of the first switch 310 and the second switch 320 and may diagnose a failure of the surge protector 100 if a change rate of the diagnostic voltage is equal to or greater than a pre-determined threshold value. In an example embodiment, the processor 200 may close the first switch 310 and open the second switch 320 and then may measure a diagnostic voltage applied to a diagnostic resistor, and may open the first switch 310 and close the second switch 320 and then may measure a diagnostic voltage applied to a diagnostic resistor.

In an implementation, referring to FIG. 3, the processor 200 may close (ON) the first switch 310 and open (OFF) the second switch 320 and then may measure a diagnostic voltage applied to a diagnostic resistor. In this case, the first closed circuit L1 including the first line resistor 31, the first diagnostic resistor 32, the second diagnostic resistor 34, the first protection element 101, and the second protection element 102 is generated. In this case, the processor 200 may measure a voltage applied to both ends of the second diagnostic resistor 34. In an example embodiment, a voltage applied to the second diagnostic resistor 34 may be expressed by voltage division as shown in Equation 1 below.

$$V_{PE2} = \frac{CMV(+)}{R\_Plus + R\_PE1 + R\_PE2 + R\_(MOV1 + MOV2)} \times R_{PE2} \qquad \text{(Equation 1)}$$

In this example implementation, $V_{PE2}$ is a voltage value of a voltage applied to the second diagnostic resistor 34, CMV(+) is a voltage value of a voltage between the ground 12 and the positive electrode 11 of the battery applied to the first closed circuit L1, R_Plus is a resistance value of the first line resistor 31, R_PE2 is a resistance value of the second diagnostic resistor 34, R_PE1 is a resistance value of the first diagnostic resistor 32, MOV2 is a resistance value of the second protection element 102, and MOV1 is a resistance value of the first protection element 101.

In Equation 1, R_Plus, R_PE1, and R_PE2 are resistance values of resistive elements and are values that do not change, and CMV(+) is a value due to parasitic capacitance between battery potential and the ground and may have a deviation of up to about 30% according to an SOC of the battery, (e.g., a difference between fully charged and fully discharged). In some embodiments, it may be found that there is a change in R_(MOV1+MOV2) that is a composite resistance value of the first protection element 101 and the second protection element 102 if a change rate of V_PE2 is 30% or more, and thus, it may be identified that the first protection element 101 or the second protection element 102 is deteriorated.

Also, even if the first switch 310 is opened and the second switch 320 is closed and then a diagnostic voltage applied to a diagnostic resistor is measured, according to the same principle, it may be found that there is a change in a composite resistance value of the second protection element 102 and the third protection element 103 and thus, it may be found that the second protection element 102 or the third protection element 103 is deteriorated.

Figure 5:
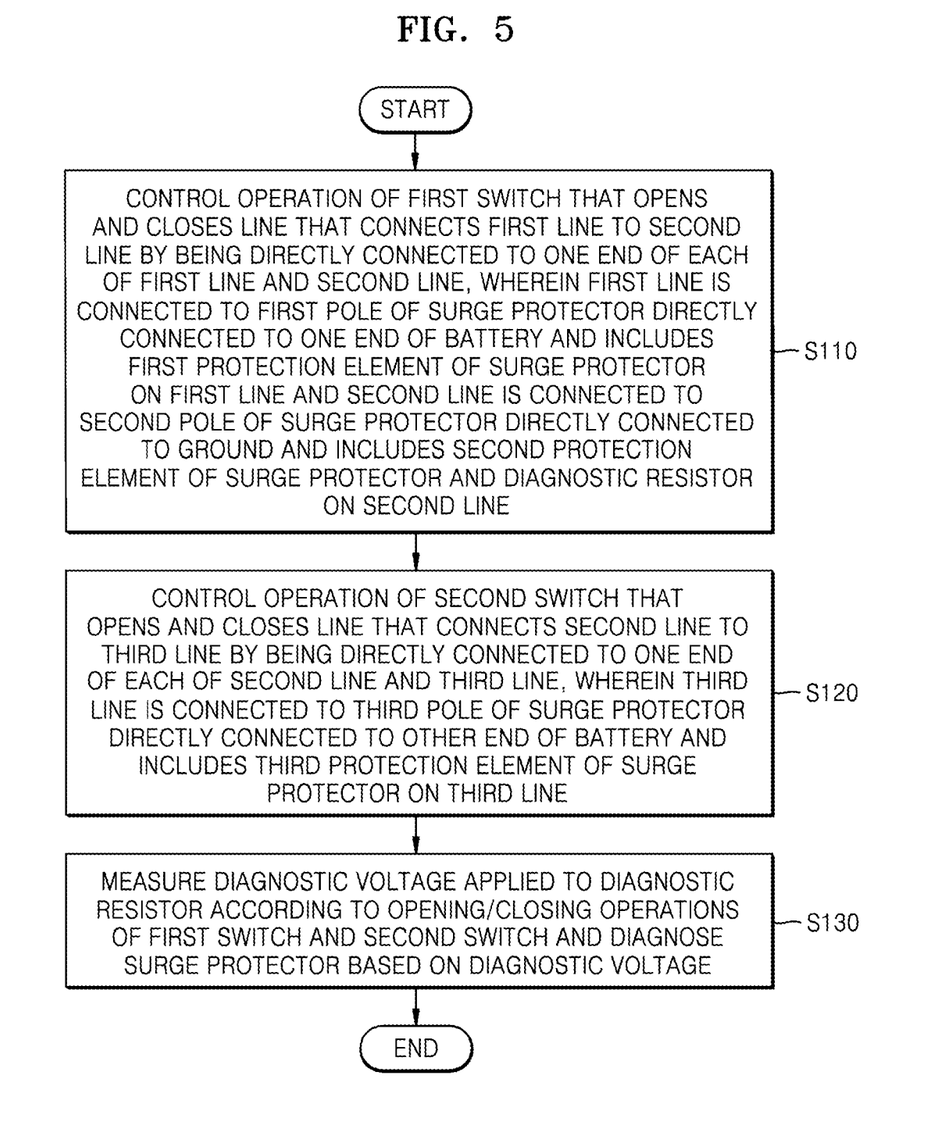
FIG. 5 is a flowchart for describing a surge protector diagnosing method, according to embodiments of the present disclosure.

FIG. 5 is a flowchart for describing a surge protector diagnosing method, according to embodiments of the present disclosure.

Referring to FIG. 5, in operation S110, the processor 200 may control an operation of the first switch 310 that opens and closes a line that connects the first line 21 to the second line 22 by being directly connected to one end of each of the first line 21 and the second line 22. In this example implementation, the first line 21 may be connected to a first pole of the surge protector 100 directly connected to one end of a battery and may include the first protection element 101 of the surge protector 100 on the first line. Also, the second line 22 may be connected to a second pole of the surge protector 100 directly connected to a ground and may include the second protection element 102 of the surge protector 100 and a diagnostic resistor on the second line.

In operation S120, the processor 200 may control an operation of the second switch 320 that opens and closes a line that connects the second line 22 to the third line 23 by being directly connected to one end of each of the second line 22 and the third line 23. The third line 23 may be connected to a third pole of the surge protector 100 directly connected to the other end of the battery and may include the third protection element 103 of the surge protector 100 on the third line.

In operation S130, the processor 200 may measure a diagnostic voltage applied to a diagnostic resistor according to an opening/closing operation of the first switch 310 and the second switch 320 and may diagnose the surge protector 100 based on the diagnostic voltage. In an implementation, the processor 200 may diagnose a degree of deterioration of a protection element provided in the surge protector 100.

The processor 200 according to embodiments of the present disclosure may form the first closed circuit L1 that connects the first line 21 to the second line 22 by closing the first switch 310 and opening the second switch 320. Also, the processor 200 may to measure a diagnostic voltage applied to a diagnostic resistor by allowing a voltage between the ground and one end of the battery applied to the first closed circuit L1 to be distributed to the first protection element 101, the second protection element 102, and a resistor on the first closed circuit L1 including the diagnostic resistor.

The processor 200 according to embodiments of the present disclosure may form the second closed circuit L2 that connects the second line 22 to the third line 23 by opening the first switch 310 and closing the second switch 320. Also, the processor 200 may measure a diagnostic voltage applied to a diagnostic resistor by allowing a voltage between the ground and the other end of the battery applied to the second closed circuit L2 to be distributed to the second protection element 102, the third protection element 103, and a resistor on the second closed circuit L2 including the diagnostic resistor.

The processor 200 according to embodiments of the present disclosure may periodically measure a diagnostic voltage applied to a diagnostic resistor by alternately controlling opening/closing of the first switch 310 and the second switch 320 and may diagnose a failure of the surge protector 100 if a change rate of the diagnostic voltage is equal to or greater than a pre-determined threshold value.

The various embodiments described above may be implemented as computer programs executable through various components on a computer, and the computer programs may be stored in a computer-readable medium. In this case, the medium may continuously store the computer-executable programs, or may temporally store the computer-executable programs for execution or downloading. Also, the medium may be any of various recording media or storage media in which a single piece or plurality of pieces of hardware are combined, and the medium is not limited to a medium directly connected to a computer system, but may be distributed on a network. Examples of the medium may include magnetic media such as a hard disk, a floppy disk, and a magnetic tape, optical recording media such as a CD-ROM and a DVD, magneto-optical media such as a floptical disk, and devices configured to store program instructions such as a ROM, a random-access memory (RAM), and a flash memory. Also, other examples of the medium may include recording media and storage media managed by application stores distributing applications or by websites, servers, and the like supplying or distributing other various types of software.

In the specification, the term "unit" or "module" may be a hardware component such as a processor or circuit and/or a software component executed by a hardware component such as a processor. In an example embodiment, the "unit" or "module" may be implemented by components, such as software components, object-oriented software components, class components, and task components, processes, functions, attributes, procedures, subroutines, segments of program code, drivers, firmware, micro codes, circuits, data, a database, data structures, tables, arrays, and variables.

According to the present disclosure, a method and apparatus for effectively diagnosing a degree of deterioration of a surge protector connected to a battery may be provided. However, effects obtainable from the present disclosure may not be limited to those effects. Other unmentioned effects may be clearly understood from the disclosure by one of ordinary skill in the art to which the present disclosure pertains.

One or more embodiments include a method and apparatus for diagnosing a degree of deterioration of a surge protector connected to a battery. However, technical objectives to be achieved by the present disclosure are not limited thereto, and other unmentioned technical objectives will be apparent to one of ordinary skill in the art from the description of the present disclosure.

Additional embodiments will be set forth in the disclosure will be apparent from the description, or may be learned by practice of the presented embodiments.

According to one or more embodiments, an apparatus for diagnosing a surge protector connected to a battery may include a first line connected to a first pole of the surge protector, the first line directly connected to one end of the battery and including a first protection element of the surge protector on the first line, a second line connected to a second pole of the surge protector, the second line directly connected to a ground and including a second protection element of the surge protector and a diagnostic resistor on the second line, a third line connected to a third pole of the surge protector, the third line directly connected to the other end of the battery and including a third protection element of the surge protector on the third line, a first switch configured to open and close a line that connects the first line to the second line by being directly connected to one end of each of the first line and the second line, a second switch configured to open and close a line that connects the second line to the third line by being directly connected to one end of each of the second line and the third line, and a processor configured to control opening/closing operations of the first switch and the second switch, measure a diagnostic voltage applied to the diagnostic resistor according to the opening/closing operations of the first switch and the second switch, and diagnose the surge protector based on the diagnostic voltage.

The processor may be further configured to form a first closed circuit that connects the first line to the second line by closing the first switch and opening the second switch.

The processor may be further configured to measure a diagnostic voltage applied to the diagnostic resistor by allowing a voltage between the ground and one end of the battery applied to the first closed circuit to be distributed to the first protection element, the second protection element, and a resistor on the first closed circuit including the diagnostic resistor.

The processor may be further configured to form a second closed circuit that connects the second line to the third line by opening the first switch and closing the second switch.

The processor may be further configured to measure a diagnostic voltage applied to the diagnostic resistor by allowing a voltage between the ground and the other end of the battery applied to the second closed circuit to be distributed to the second protection element, the third protection element, and a resistor on the second closed circuit including the diagnostic resistor.

The processor may be further configured to periodically measure the diagnostic voltage applied to the diagnostic resistor by alternately controlling opening/closing of the first switch and the second switch and diagnose a failure of the surge protector if a change rate of the diagnostic voltage is equal to or greater than a pre-determined threshold value.

The diagnostic resistor may include a first diagnostic resistor and a second diagnostic resistor connected in series on the second line, the second diagnostic resistor having a lower resistance value than the first diagnostic resistor, wherein the processor may be further configured to measure a diagnostic voltage applied to the second diagnostic resistor and diagnose the surge protector based on the diagnostic voltage.

According to one or more embodiments, a method of diagnosing a surge protector connected to a battery includes controlling an operation of a first switch that opens and closes a line that connects a first line to a second line by being directly connected to one end of each of the first line and the second line, wherein the first line is connected to a first pole of the first surge protector, the first line directly connected to one end of the battery and includes a first protection element of the surge protector on the first line and the second line is connected to a second pole of the surge protector, the second line directly connected to a ground and includes a second protection element of the surge protector and a diagnostic resistor on the second line, controlling an operation of a second switch that opens and closes a line that connects the second line to a third line by being directly connected to one end of each of the second line and the third line, wherein the third line is connected to a third pole of the surge protector, the third line directly connected to the other end of the battery and includes a third protection element of the surge protector on the third line, and measuring a diagnostic voltage applied to the diagnostic resistor according to opening/closing operations of the first switch and the second switch and diagnosing the surge protector based on the diagnostic voltage.

The diagnosing of the surge protector may include forming a first closed circuit that connects the first line to the second line by closing the first switch and opening the second switch.

The diagnosing of the surge protector may include measuring a diagnostic voltage applied to the diagnostic resistor by allowing a voltage between the ground and one end of the battery applied to the first closed circuit to be distributed to the first protection element, the second protection element, and a resistor of the first closed circuit including the diagnostic resistor.

The diagnosing of the surge protector may include forming a second closed circuit that connects the second line to the third line by opening the first switch and closing the second switch. The diagnosing of the surge protector may include measuring a diagnostic voltage applied to the diagnostic resistor by allowing a voltage between the ground and the other end of the battery applied to the second closed circuit to be distributed to the second protection element, the third protection element, and a resistor on the second closed circuit including the diagnostic resistor.

The diagnosing of the surge protector may include periodically measuring the diagnostic voltage applied to the diagnostic resistor by alternately controlling opening/closing of the first switch and the second switch and diagnosing a failure of the surge protector if a change rate of the diagnostic voltage is equal to or greater than a pre-determined threshold value.

The diagnostic resistor may include a first diagnostic resistor and a second diagnostic resistor connected in series on the second line, the second diagnostic resistor having a lower resistance value than the first diagnostic resistor, wherein the diagnosing of the surge protector may include measuring a diagnostic voltage applied to the second diagnostic resistor and diagnosing the surge protector based on the diagnostic voltage.

According to one or more embodiments, there is provided a computer program stored in a recording medium to execute the method by using a computing device.

It should be understood that embodiments described herein should be considered in a descriptive sense only and not for purposes of limitation. Descriptions of features within each embodiment should typically be considered as available for other similar features in other embodiments. While one or more embodiments have been described with reference to the figures, it will be understood by one of ordinary skill in the art that various changes in form and details may be made therein without departing from the spirit and scope of the present disclosure as defined by the following claims.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. It will be understood by those of skill in the art that various changes in form and details may be made without departing from the spirit and scope of the present invention as set forth in the following claims.

What is claimed is:

1. An apparatus for diagnosing a surge protector connected to a battery, the apparatus comprising:
   a first line connected to a first pole of the surge protector directly connected to one end of the battery and including a first protection element of the surge protector on the first line;
   a second line connected to a second pole of the surge protector directly connected to a ground and including a second protection element of the surge protector and a diagnostic resistor on the second line;
   a third line connected to a third pole of the surge protector directly connected to another end of the battery and including a third protection element of the surge protector on the third line;
   a first switch configured to open and close a line that connects the first line to the second line by being directly connected to one end of each of the first line and the second line;
   a second switch configured to open and close a line that connects the second line to the third line by being directly connected to one end of each of the second line and the third line; and
   a processor configured to control opening and closing operations of the first switch and the second switch, measure a diagnostic voltage applied to the diagnostic resistor according to the opening and closing operations of the first switch and the second switch, and diagnose the surge protector based on the diagnostic voltage.

2. The apparatus as claimed in claim 1, wherein the processor is further configured to form a first closed circuit that connects the first line to the second line by closing the first switch and opening the second switch.

3. The apparatus as claimed in claim 2, wherein the processor is further configured to measure a diagnostic voltage applied to the diagnostic resistor by allowing a voltage between the ground and one end of the battery applied to the first closed circuit to be distributed to the first protection element, the second protection element, and a resistor on the first closed circuit including the diagnostic resistor.

4. The apparatus as claimed in claim 1, wherein the processor is further configured to form a second closed circuit that connects the second line to the third line by opening the first switch and closing the second switch.

5. The apparatus as claimed in claim 4, wherein the processor is further configured to measure a diagnostic voltage applied to the diagnostic resistor by allowing a voltage between the ground and the other end of the battery applied to the second closed circuit to be distributed to the second protection element, the third protection element, and a resistor on the second closed circuit including the diagnostic resistor.

6. The apparatus as claimed in claim 1, wherein the processor is further configured to periodically measure the diagnostic voltage applied to the diagnostic resistor by alternately controlling opening and closing of the first switch and the second switch and diagnosing a failure of the surge protector when a change rate of the diagnostic voltage is equal to or greater than a pre-determined threshold value.

7. The apparatus as claimed in claim 1, wherein the diagnostic resistor includes a first diagnostic resistor and a second diagnostic resistor connected in series on the second line, the second diagnostic resistor having a lower resistance value than the first diagnostic resistor, and
   wherein the processor is further configured to measure a diagnostic voltage applied to the second diagnostic resistor and diagnose the surge protector based on the measured diagnostic voltage.

8. A method of diagnosing a surge protector connected to a battery, the method comprising:
   controlling an operation of a first switch that opens and closes a line that connects a first line to a second line by being directly connected to one end of each of the first line and the second line, wherein the first line is connected to a first pole of the surge protector directly connected to one end of the battery and includes a first protection element of the surge protector on the first line and the second line is connected to a second pole of the surge protector directly connected to a ground and includes a second protection element of the surge protector and a diagnostic resistor on the second line;
   controlling an operation of a second switch that opens and closes a line that connects the second line to a third line by being directly connected to one end of each of the second line and the third line, wherein the third line is connected to a third pole of the surge protector directly connected to another end of the battery and includes a third protection element of the surge protector on the third line; and
   measuring a diagnostic voltage applied to the diagnostic resistor according to opening and closing operations of the first switch and the second switch and diagnosing the surge protector based on the measured diagnostic voltage.

9. The method as claimed in claim 8, wherein the diagnosing of the surge protector includes forming a first closed circuit that connects the first line to the second line by closing the first switch and opening the second switch.

10. The method as claimed in claim 9, wherein the diagnosing of the surge protector includes measuring a diagnostic voltage applied to the diagnostic resistor by allowing a voltage between the ground and one end of the battery applied to the first closed circuit to be distributed to the first protection element, the second protection element, and a resistor of the first closed circuit including the diagnostic resistor.

11. The method as claimed in claim 8, wherein the diagnosing of the surge protector includes forming a second closed circuit that connects the second line to the third line by opening the first switch and closing the second switch.

12. The method as claimed in claim 11, wherein the diagnosing of the surge protector includes measuring a diagnostic voltage applied to the diagnostic resistor by allowing a voltage between the ground and the other end of the battery applied to the second closed circuit to be distributed to the second protection element, the third protection element, and a resistor on the second closed circuit including the diagnostic resistor.

13. The method as claimed in claim 8, wherein the diagnosing of the surge protector includes periodically measuring the diagnostic voltage applied to the diagnostic resistor by alternately controlling opening and closing of the first switch and the second switch and diagnosing a failure of the surge protector when a change rate of the diagnostic voltage is equal to or greater than a pre-determined threshold value.

14. The method as claimed in claim 8, wherein the diagnostic resistor includes a first diagnostic resistor and a second diagnostic resistor connected in series on the second line, the second diagnostic resistor having a lower resistance value than the first diagnostic resistor, and wherein the diagnosing of the surge protector includes measuring a diagnostic voltage applied to the second diagnostic resistor and diagnosing the surge protector based on the measured diagnostic voltage.

15. A non-transitory computer-readable medium storing a computer program for a method of diagnosing a surge protector connected to a battery, wherein the method comprises:

controlling an operation of a first switch that opens and closes a line that connects a first line to a second line by being directly connected to one end of each of the first line and the second line, wherein the first line is connected to a first pole of the surge protector directly connected to one end of the battery and includes a first protection element of the surge protector on the first line and the second line is connected to a second pole of the surge protector directly connected to a ground and includes a second protection element of the surge protector and a diagnostic resistor on the second line;

controlling an operation of a second switch that opens and closes a line that connects the second line to a third line by being directly connected to one end of each of the second line and the third line, wherein the third line is connected to a third pole of the surge protector directly connected to another end of the battery and includes a third protection element of the surge protector on the third line; and measuring a diagnostic voltage applied to the diagnostic resistor according to opening and closing operations of the first switch and the second switch and diagnosing the surge protector based on the measured diagnostic voltage.

* * * * *